United States Patent [19]

Kuo

[11] Patent Number: 5,322,885
[45] Date of Patent: Jun. 21, 1994

[54] AQUEOUS DISPERSION COMPOSITIONS AND COATINGS PREPARED THEREFROM

[75] Inventor: Thauming Kuo, Kingsport, Tenn.

[73] Assignee: Eastman Chemical Company, Kingsport, Tenn.

[21] Appl. No.: 970,218

[22] Filed: Nov. 2, 1992

[51] Int. Cl.$^5$ .................. C08J 5/10; C08K 3/10; C08K 5/04; C08L 33/14
[52] U.S. Cl. .................. 524/603; 523/501; 524/425; 524/430; 524/451; 524/601; 524/845; 528/279; 528/293; 528/294; 528/295
[58] Field of Search .............. 524/601, 603, 425, 451, 524/430, 845; 523/501; 528/279, 293, 294, 295

[56] References Cited

U.S. PATENT DOCUMENTS

| | | | |
|---|---|---|---|
| 3,345,313 | 10/1967 | Ruhf et al. | 260/22 |
| 3,434,987 | 3/1969 | Dhein et al. | 260/21 |
| 3,494,882 | 2/1970 | Andrews | 260/22 |
| 3,549,577 | 12/1970 | Stromberg | 260/29.4 |
| 3,563,942 | 2/1971 | Heiberger | 260/29.2 |
| 3,666,698 | 5/1972 | Harris et al. | 260/22 M |
| 3,699,066 | 10/1972 | Hunsucker | 260/22 EP |
| 3,734,874 | 5/1973 | Kibler et al. | 260/29.2 E |
| 3,779,993 | 12/1973 | Kibler et al. | 260/75 S |
| 4,233,196 | 11/1980 | Sublett | 260/29.2 N |
| 4,304,901 | 12/1981 | O'Neill et al. | 528/290 |
| 4,340,519 | 7/1982 | Kotera et al. | 523/414 |
| 4,525,524 | 6/1985 | Tung et al. | 524/601 |
| 4,698,391 | 10/1987 | Yacobucci et al. | 525/162 |
| 4,737,551 | 4/1988 | Dervan et al. | 525/440 |
| 4,910,292 | 3/1990 | Blount | 528/272 |
| 4,973,656 | 11/1990 | Blount | 528/272 |
| 4,990,593 | 2/1991 | Blount | 528/272 |

OTHER PUBLICATIONS

Derwent Abstract WPI Acc No: 68-07118Q/00 (GB 1117126).

Primary Examiner—Paul R. Michl
Assistant Examiner—U. K. Rajguru
Attorney, Agent, or Firm—Mark A. Montgomery

[57] ABSTRACT

Disclosed is pigmented dispersion containing a non-amine wetting and dispersing agent and a water-dissipatable or dispersible polyester containing sulfonate groups that has improved stability having a substantial number of capped carboxyl groups attached to the sulfomonomer moieties. This polyester can be prepared by capping the carboxyl end groups of the polyester with oxirane compounds or by polymerizing the reactants wherein one reactant is a diol that is a diester adduct of a glycol and a dicarboxylic acid sulfomonomer.

20 Claims, No Drawings

AQUEOUS DISPERSION COMPOSITIONS AND COATINGS PREPARED THEREFROM

FIELD OF THE INVENTION

The present invention relates to novel pigmented aqueous dispersion compositions containing water-dispersible polyesters, the method of their preparation, and coatings prepared therefrom.

BACKGROUND OF THE INVENTION

Regulations to limit the amount of volatile organic compounds (VOC) of industrial coatings has encouraged research and development projects directed at inventing new waterborne systems such as paints. With respect to the two most important commercial coating systems, polyesters and acrylics, it is a relatively easy task to characterize the current state-of-the-art: polymeric systems with a carbon backbone (acrylics) are more stable to hydrolysis than polyesters with their carbon-oxygen ester backbone chain. However, considerable research continues toward improving the stability of aqueous polyesters because of their inherently desirable properties of excellent hardness/flexibility ratios and outstanding gloss unattainable from aqueous acrylic systems.

U.S. Pat. No. 4,340,519 discloses the composition of certain crystalline and non-crystalline polyesters copolymerized with a metal sulfonate group-containing aromatic acid and up to 10 mol percent (based on the total polyol content) of a polyvalent polyol selected from trimethylolpropane, trimethylolethane, glycerine, and pentaerythritol. Also, U.S. Pat. No. 4,525,524 discloses liquid systems comprised of polyesters containing certain metal sulfonates and, optionally, up to 3 percent of a branching agent based upon the total diol component.

U.S. Pat. No. 3,563,942 discloses linear solvent-soluble copolyester compositions that can be dispersed in water. Water dispersibility is gained by the addition to the copolyester of a small amount (1-2 mol percent) of the metal salt of sulfonated aromatic compounds.

Many patents disclose methods to obtain water-dissipatable polyesters by neutralizing residual or unreacted carboxylic acid groups on the polymer with ammonia or various organic amines. U.S. Pat. No. 3,666,698 utilizes this method as well as phenylindandicarboxylic acid to modify coating performance. U.S. Pat. No. 3,699,066 shows the benefits of certain hydroxy-functional amines for neutralization. U.S. Pat. No. 3,549,577 utilizes the aminoresin crosslinker as the neutralizing agent then adjusts the pH to prepare an alkaline water-reduced system. In these patents as well as U.S. Pat. Nos. 3,494,882, 3,434,987, U.K. 1,117,126, and U.S. Pat. No. 3,345,313 carboxylic acid functionality is completely neutralized with excess base yielding an alkaline paint vehicle.

Amine neutralized alkyd or oil-free polyester resin used in waterborne coatings is cured at ambient temperature or by baking. In these resins, the carboxyl endgroups are neutralized with an amine such as ammonium hydroxide, triethyl amine, or N,N'-dimethylaminoethanol (DMAE) to yield ammonium salts which can then be dispersed in water to give waterborne enamels. When the enamel is cured, the amine is given off.

U.S. Pat. Nos. 4,910,292, 4,973,656, and 4,990,593 the disclosures of which are incorporated herein in their entirety by reference, disclose an improved novel water-borne polyester resin and coatings specifically containing 5-(sodiosulfo)-isophthalic acid (5-SSIPA or SIP). The resins are prepared by reacting neopentyl glycol (NPG), trimethylolpropane (TMP), isophthalic acid (IPA), and 5-SSIPA in the first stage, followed by the addition of IPA and adipic acid (AD) in the second stage. The clear coating prepared from this resin exhibits good properties of gloss, hardness, flexibility, and solvent resistance. Moreover, the coating is water-resistant, despite the presence of ionic sulfonate groups. However, as with other polyester resins, aqueous dispersions of these resins do not have adequate storage stability and phase-separate over time. Additionally, the pigmented enamels prepared from these dispersions do not have adequate storage stability and phase separate in a relatively short period of time.

A solution to the stability problem is disclosed in U.S. application Ser. No. 07/765,606 filed Sep. 25, 1991, the disclosure of which is incorporated herein in its entirety by reference. This application discloses end-capping the dicarboxylic acid sulfomonomer. However, pigmented coatings of these compositions are not very water resistant and form wrinkles when cured.

It would, therefore, be very desirable to be able to improve the overall stability, coating smoothness, and coating water resistance of pigmented enamels prepared from dispersions of water-dispersible polyester resins.

SUMMARY OF THE INVENTION

The present invention is directed to a coating composition that comprises an aqueous dispersion that is in the substantial absence of basic amines containing water, pigment, non-amine wetting and dispersing additive, and a polyester having chains containing carboxylic acid capped sulfomonomer residue prepared from a dicarboxylic acid sulfomonomer.

The present invention is further directed to the process of preparing the coating composition. The present invention is also directed to articles coated with the dispersion compositions and will be described hereinafter.

DETAILED DESCRIPTION OF THE INVENTION

The present invention is more particularly directed to a dispersion composition comprising water, pigment, non-amine wetting and dispersing additive, and the polyester made of the moieties of reaction products:

(a) at least one difunctional dicarboxylic acid which is not a sulfomonomer;

(b) about 1 to 20 mol % of at least one dicarboxylic acid sulfomonomer containing at least one metallic sulfonate group or nitrogen-containing non-metallic sulfonate group attached to an aromatic or cycloaliphatic nucleus;

(c) at least one difunctional reactant selected from a glycol or a mixture of a glycol and diamine having two —NRH groups, the glycol containing two —C(R$^1$-)$_2$—OH groups wherein R in the reactant is hydrogen or an alkyl group of 1 to 6 carbon atoms, and R$^1$ in the reactant is a hydrogen atom, an alkyl of 1 to 5 carbon atoms, or an aryl group of 6 to 10 carbon atoms;

(d) about 0 to 40 mol % of difunctional reactant selected from hydroxycarboxylic acids having one —C(R)$_2$—OH group, aminocarboxylic acids having one —NRH group, amino-alcohols having one —C(R-)$_2$—OH group and one —NRH group, or mixtures of said difunctional reactants wherein R in the reactant is hydrogen or an alkyl group of 1 to 6 carbon atoms; and (e) 0 to 40 mol % of a multifunctional reactant containing at least three functional groups selected from hydroxyl, carboxyl, and mixtures thereof, wherein the polyester has a predispersion pH greater than 4 with a substantial number of the carboxyl end groups attached to reactant (b) residue being capped and wherein all stated mol percentages are based on the total of all acid, hydroxyl and amino group containing reactants being equal to 200 mol %, and wherein the polymer contains proportions of acid-group containing reactants (100 mol % acid) to hydroxy- and amino-group containing reactants (100 mol % base) such that the value of EQ (base) divided by EQ (acid) is between about 1 and 1.6, further wherein the dispersion composition is in the substantial absence of basic amine additives.

Preferred alkyl groups are methyl, ethyl, n-propyl, isopropyl, n-butyl, sec-butyl and iso-butyl; preferred aryl groups are phenyl and naphthyl.

The present invention is also particularly directed to a process for the preparation of a polyester dispersion composition that is in the substantial absence of basic amine additives and has the carboxyl end groups oxirane end capped comprising:

(I) reacting the reactants (a), (b), (c), (d), and (e) under polycondensation conditions;

(II) reacting the resultant polyester with about 1 to 15 weight % of at least one reactive oxirane containing compound; and (III) dispersing the reacted polyester of II, pigment, and non-amine wetting and dispersing additive in water; wherein reactants (a), (b), (c), (d), and (e) are as above and wherein the resulting polyester has a predispersion pH greater than 4 with a substantial number of the carboxyl end groups attached to reactant (b) residue being capped.

The present invention is also directed to another process for the preparation of a polyester dispersion composition that is in the substantial absence of basic amine additives comprising:

1) reacting the following reactants under polycondensation conditions;

(a) at least one difunctional dicarboxylic acid which is not a sulfomonomer;

(b) about 1 to 20 mol % of at least one diol that is a diester adduct of a glycol and a dicarboxylic acid sulfomonomer containing at least one metallic sulfonate group or nitrogen-containing non-metallic sulfonate group attached to an aromatic or cycloaliphatic nucleus;

(c) at least one difunctional reactant selected from a glycol or a mixture of a glycol and diamine having two —NRH groups, the glycol containing two —C($R^1$)$_2$—OH groups wherein R in the reactant is hydrogen or an alkyl group of 1 to 6 carbon atoms, and $R^1$ in the reactant is a hydrogen atom, an alkyl of 1 to 5 carbon atoms, or an aryl group of 6 to 10 carbon atoms;

(d) about 0 to 40 mol % of difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants wherein R in the reactant is hydrogen or an alkyl group of 1 to 6 carbon atoms; and (e) 0 to 40 mol % of a multifunctional reactant containing at least three functional groups selected from hydroxyl, carboxyl, and mixtures thereof; and 2) dispersing the polyester, pigment, and non-amine wetting and dispersing additive in water;

wherein the resulting polyester has a predispersion pH greater than 4 with a substantial number of the carboxyl end groups attached to reactant (b) residue being capped and wherein all stated mol percentages are based on the total of all acid, hydroxyl and amino group containing reactants being equal to 200 mol %, and wherein the polymer contains proportions of acid-group containing reactants (100 mol % acid) to hydroxy- and amino-group containing reactants (100 mol % base) such that the value of EQ (base) divided by EQ (acid) is between about 1 and 1.6.

The applicant has unexpectedly discovered that pigmented coatings prepared from the dispersion containing the above water dispersible polyesters can be rendered water insensitive and substantially wrinkle free. This improvement is due to the use of a non-amine wetting and dispersing additive, although an amine wetting and dispersing additive was at first thought to be the best wetting and dispersing additive. Applicant unexpectedly discovered that baked pigmented coatings containing a basic amine wetting and dispersing additive were water sensitive and formed wrinkles and then unexpectedly discovered that this was due to the presence of the basic amine. This is particularly unexpected since prior art pigmented coatings containing amines do not have this problem because the amines are volatile and baking should remove any residual amines. Applicant unexpectedly discovered that when the amine additive is replaced with a non-amine wetting and dispersing additive the resulting pigmented coatings are water resistant and do not wrinkle. Evidently, even after baking, the amine additive or the effect of having had an amine additive present significantly affects the coating properties of the above resin.

Prior to the present invention, it was not known that basic amine additives had a detrimental effect on these dispersions containing the water dispersible polyesters made with a sulfomonomer. The applicant discovered that basic amine additives detrimentally affected these dispersions even after the water dispersible polyester had been stabilized by the required end capping of the carboxylic acid end groups attached to the reacted sulfomonomer.

In addition to the pigmented aqueous dispersion needing a non-amine wetting and dispersing additive, the carboxylic acid groups on the ends of the polyester chains containing sulfomonomer must be capped or reacted and no longer be acidic so that the resulting aqueous polyester dispersions have substantially improved stability. It is envisioned that any method of hiding, reacting, or capping the carboxylic acid end groups would be beneficial to improve the stability of the dispersions of the resin. All of these methods are covered herein by the generic term "capping". It is, however, more preferred that the carboxylic acid end groups that are associated with the sulfomonomer be substantially reduced, more preferably, essentially eliminated.

Water dispersible resins containing the sulfomonomer such as 5-SSIPA resin, cold flow at room temperature. Therefore, it is very desirable to store these resins in a predispersion containing a substantial amount of polyester in the liquid. However, these predispersions are generally unstable and separate out over time due to instability resulting from unreacted carboxylic acid end groups. Thus the composition according to the present invention preferably is in the form of a dispersion having a pH between about 4 and 7 and has essentially no free carboxyl end groups attached to the sulfomonomer residue of reactant (b). These carboxyl end groups are preferably capped with oxirane compounds or glycols.

The preferred methods for arriving at the stabilized polyester resins used in the pigmented aqueous dispersion compositions of the present invention are as follows:

Method 1—The resin is prepared substantially as disclosed in U.S. Pat. No. 4,910,292 and is then treated with an excess amount of an oxirane containing compound to reduce the carboxyl end groups, particularly those attached to the sulfomonomer.

Method 2—The polyester resin is prepared as above except that the carboxylic acid groups of the sulfomonomer are already capped with a glycol prior to polymerization. The resulting sulfomonomer used in the polymerization is a diester adduct.

Method 3 is a modification of Method 2 and the sulfomonomer is capped or formed into the diester adduct in situ by reacting the carboxylic acid groups of the sulfomonomer with an excess of the glycol as the first step of polymerization.

The final step of Method 1, in which the resin is treated with an oxirane compound, is preferably conducted at a temperature between about room temperature and 230° C. for a time up to about 20 hours. More preferably at a temperature between about 150 and 200° C. for a time between about 2 and 4 hours. The amount of oxirane compound used in this final step is an amount sufficient to react or cap a substantial portion, if not substantially all, of the carboxyl end groups. This amount is preferably in molar excess and is between about 1 and 15 weight percent based on the weight of polyester with between about 5 and 10 being more preferred. The preferred oxirane compounds are the more reactive oxirane compounds and are preferably selected from branched and linear 1,2-epoxyalkanes; saturated and unsaturated, linear and branched, aromatic and aliphatic $C_3$–$C_8$ glycidyl ethers; saturated and unsaturated, linear and branched, aromatic and aliphatic $C_3$–$C_{18}$ glycidyl esters; epoxidized oils and esters with oxirane content higher than 5%; and epoxy resins being products of the reaction of epichlorohydrin and bisphenol A, with the more preferred oxirane containing compounds having an epoxy equivalent weight less than 300. Suitable examples of the above oxirane containing compounds include propylene oxide, 2-ethyl hexyl glycidyl ether (from Dow Chemical Company), cresyl glycidyl ether (from Dow Chemical Company), glycidyl ester of monocarboxylic acid mixtures (Cardura E-10 from Shell Chemical Company), Drapex 6.8 and Drapex 10.4 epoxy plasticizer (from Argus Division, Witco Corporation), and D.E.R. 331 and D.E.R. 332 (from Dow Chemical Company).

The most preferred oxirane containing compounds are from propylene oxide, diglycidyl ethers of bisphenol A having an epoxy equivalent weight less than 300, and mixtures thereof.

Method 2 in which the resin is prepared from the above reactants (a), (b), (c), (d), and (e), except that the sulfomonomer is a diol that is a diester adduct of a glycol and the original sulfomonomer, is preferably conducted at a temperature of about 160° to 240° C. The glycol used to make the adduct is preferably selected from ethylene glycol, propylene glycol, 2-ethyl-2-butyl-1,3-propanediol, neopentyl glycol, cyclo-hexanedimethanol, hydroxypivalyl hydroxypivalate, 1,6-hexanediol, 2,2,4-trimethyl-1,3-pentanediol, diethylene glycol and mixtures thereof. The most preferred diester adducts of glycol and sulfomonomer are bis(2-hydroxyethyl)-5-sodiosulfoisophthalate and bis(3-hydroxy-2,2-dimethylpropyl)-5-sodiosulfoisophthalate.

The first step of Method 3 in which the diester adduct is prepared in situ prior to polymerization, is preferably conducted at a temperature between 150° and 230° C. Glycol is preferably added in large molor excess and can be so high that it is the entire supply of glycol, eliminating the need of glycol in subsequent steps.

As used herein the term "multifunctional" or "branch-inducing" refers to a compound having three or more reactive hydroxyl and/or carboxyl substituents such as a triol or a tricarboxylic acid; the term "glycol" refers to a compound having two hydroxyl substituents; the term "polyol" refers to a compound having at least two hydroxyl substituents; the term "water-dissipatable polyesters," water-dissipatable polymer," "polyester material," or "the polyester" refers to the polyester or polyesteramide described above.

Whenever the term "water-dissipatable" or "water-dispersible" is used in this description, it will be understood to refer to the activity of a water or aqueous solution on the polymer. The term is specifically intended to cover those situations wherein the solution dissolves and/or disperses the polyester material therein and/or therethrough.

The term "EQ(base)" means the total number of equivalents of all (100 mol % base) of the hydroxyl and amino functionality from (b), (c), (d) and (e). This total is obtained by multiplying the number of mols of each reactant in this grouping by its functionality, i.e., the total number of hydroxyl plus amino groups per mol of reactant which are available for condensation polymerization with acid (or ester) groups; and the term "EQ(acid)" means the total number of equivalents of all (100 mol % acid) of the acid functionality from (a), (b), (d) and (e). This total is obtained by multiplying the number of mols of each reactant in this grouping by its functionality, i.e., the total number of acid groups (or equivalent ester and amide-forming derivatives thereof) which are available for condensation polymerization with hydroxyl and amino groups.

A single reactant from (b), (d) and (e) may contain both acid and hydroxy and/or amino functional groups. For the purposes of satisfying the relationship between the total number of mols of hydroxy- and amino-bearing reactants (100 mol % base) and the total number of mols of acid-bearing reactants (100 mol % acid) as well as the values of EQ(base) and EQ(acid), a reactant of this type is treated in the following manner: The molar and equivalent amounts of such reactants are proportionally distributed based on the ratio of the two types of functional groups. For example, when a water dispersible polyester resin of this invention is manufactured by reacting 0.8 mol of 2,2-dimethyl-1,3-propanediol (NPG) (reactant type (c) having two hydroxyl groups per mol), 0.05 mol of 5-sodiosulfoisophthalic acid (5-SSIPA) (reactant type (b) having two acid groups per mol), 0.30 mol of 2-methyl-2-carboxy-1,3-propanediol (MCPD) (reactant type (e) having two hydroxyl groups and one acid group per mol), and 0.85 mol of isophthalic acid (IPA) (reactant type (a) having two acid groups per mol) the molar percentages and EQ values are:

| Reactant | Mols | | Mol % |
|---|---|---|---|
| Base Components | | | |
| | | EQ(Base) | |
| NPG | 0.80 | 1.6 | 72.7 |
| MCPD | 0.30 | 0.6 | 27.3 |
| Total | 1.10 | 2.2 | 100.0 |
| Acid Components | | | |
| | | EQ(Acid) | |
| 5-SSIPA | 0.05 | 0.10 | 4.2 |
| MCPD | 0.30 | 0.30 | 25.0 |
| IPA | 0.85 | 1.70 | 70.8 |
| Total | 1.20 | 2.10 | 100.0 |

EQ(base)/EQ(acid) = 2.2/2.1 = 1.048

Reactant (b) in the polyester of the present invention is a difunctional monomer containing a —$SO_3M$ group attached to an aromatic nucleus, wherein M is hydrogen or a metal ion. This difunctional monomer component may be either a dicarboxylic acid or a diol adduct containing a —$SO_3M$ group. The metal ion of the sulfonate salt group may be $Na+$, $Li+$, $K+$, $Mg++$, $Ca++$, $Cu++$, $Fe++$, or $Fe+++$; preferred are monovalent cations.

The —$SO_3M$ group is attached to an aromatic nucleus, examples of which include benzene, naphthalene, anthracene, diphenyl, oxydiphenyl, sulfonyldiphenyl, and methylenediphenyl.

The nonmetallic portion of the nonmetallic sulfonate group optionally present in reactant (b) is a nitrogen-based cation derived from nitrogen-containing bases which may be aliphatic, cycloaliphatic or aromatic basic compounds that have ionization constants in water at 25° C. of $10^{-3}$ to $10^{-10}$, preferably $10^{-5}$ to $10^{-8}$. Especially preferred nitrogen containing bases are ammonia, dimethylethanolamine, diethanolamine, triethanolamine, pyridine, morpholine, and piperidine. Such nitrogen-containing bases and cations derived therefrom are described in U.S. Pat. No. 4,304,901, incorporated herein by reference.

It is preferred that reactant (b) is present in an amount of about 1 to 20 mol percent, more preferred is about 2 to 12 mol percent; and most preferred is about 3 mol percent.

The dicarboxylic acid component (reactant (a)) of the polyester comprises aliphatic dicarboxylic acids, alicyclic dicarboxylic acids, aromatic dicarboxylic acids, or mixtures of two or more of these acids. Examples of such dicarboxylic acids include oxalic; malonic; dimethylmalonic; succinic; glutaric; adipic; trimethyladipic; pimelic; 2,2-dimethylglutaric; azelaic; sebacic; fumaric; maleic; itaconic; 1,3-cyclopentanedicarboxylic; 1,2-cyclohexanedicarboxylic; 1,3-cyclohexanedicarboxylic; 1,4-cyclohexanedicarboxylic; phthalic; terephthalic; isophthalic; 2,5-norbornanedicarboxylic; 1,4-naphthalic; diphenic; 4,4'-oxydibenzoic; diglycolic; thiodipropionic; 4,4'-sulfonyldibenzoic; and 2,5-naphthalenedicarboxylic acids and esters thereof.

Preferred difunctional dicarboxylic acids (reactant (a)) include isophthalic acid, terephthalic acid, phthalic anhydride (acid), adipic acid, tetrachlorophthalic anhydride, pivalic acid, dodecanedioic acid, sebacic acid, azelaic acid, 1,4-cyclohexanedicarboxylic acid, 1,3-cyclohexane-dicarboxylic acid, maleic anhydride, fumaric acid, succinic anhydride (acid), 2,6-naphthalenedicarboxylic acid, glutaric acid and esters thereof.

It is preferred that reactant (c) is a glycol or mixture of glycols. The glycol component may consist of aliphatic, alicyclic, and aralkyl glycols. Examples of these glycols include ethylene glycol; propylene glycol; 1,3-propanediol; 2,4-dimethyl-2-ethyl-hexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol. Examples of other suitable glycols are poly(ethylene glycols) which include diethylene glycol, triethylene glycol, tetraethylene glycol, and pentaethylene, hexaethylene, heptaethylene, octaethylene, nonaethylene, and decaethylene glycols, and mixtures thereof. A preferred poly(ethylene glycol) employed in the polyester of the present invention is diethylene glycol or triethylene glycol or mixtures thereof. Copolymers may be prepared from two or more of the above glycols. Preferred glycols include ethylene glycol; diethylene glycol; 2,2-dimethyl-1,3-propanediol; 2-ethyl-2-butyl-1,3-propanediol; 2,2,4-trimethyl-1,3-pentanediol; 1,4-cyclohexane-dimethanol; 1,3-cyclo-hexanedimethanol; hydroxypivalyl hydroxypivalate; dipropylene glycol; 1,6-hexanediol; 1,10-decanediol; 1,3-butanediol; hydrogenated bisphenol A; 1,4-butanediol and the like.

Advantageous difunctional components which are aminoalcohols include aromatic, aliphatic, heterocyclic and other types as in regard to component (d). Specific examples include 5-aminopentanol-1,4-aminomethylcyclohexanemethanol, 5-amino-2-ethyl-pentanol-1,2-(4-β-hydroxyethoxyphenyl)-1-aminoethane, 3-amino-2,2-dimethylpropanol, hydroxyethylamine, etc. Generally these aminoalcohols contain from 2 to 20 carbon atoms, one —NRH group and one —$C(R)_2$—OH group.

Advantageous difunctional monomer components which are aminocarboxylic acids include aromatic aliphatic, heterocyclic, and other types as in regard to component (d) and include lactams. Specific examples include 6-aminocaproic acid, its lactam known as caprolactam, omega-aminoundecanoic acid, 3-amino-2-dimethylpropionic acid, 4-(β-aminoethyl)-benzoic acid, 2-(β-aminopropoxy)benzoic acid, 4-aminomethylcyclohexanecarboxylic acid, 2-(β-aminopropoxy)cyclohexanecarboxylic acid, etc. Generally these compounds contain from 2 to 20 carbon atoms.

Advantageous examples of difunctional monomer component (d) which are diamines include ethylenediamine; hexamethylenediamine; 2,2,4-trimethylhexamethylenediamine; 4-oxaheptane-1,7-diamine; 4,7-dioxadecane-1,10-diamine; 1,4-cyclohexanebismethylamine; 1,3-cycloheptamethylenediamine; dodecamethylenediamine, etc.

Reactant (e) preferably contain 3 to 6 hydroxyl and-/or carboxyl groups; most preferred is trimethylolpropane (TMP), trimethylolethane (TME), glycerine, pentaerylthritol, erytritol, threitol, dipentaerythritol, sorbitol, trimellitic anhydride, pyromellitic dianhydride, or dimethylolpropionic acid.

It is preferred that reactant (e) is present in a minor amount up to 40 mol percent, more preferred is about 1 to 20 mol percent, and most preferred is about 10 to 20 mol percent.

In other more preferred embodiments of the invention: the water-dissipatable polyester comprises an acid component (moiety) of 20 to about 100 mol percent isophthalic acid, about 10 to about 80 mol percent adipic acid and from about 1 to 20 mol percent 5-sodiosulfoisophthalic acid, and a polyol component (moiety) of at least about 60 mol percent neopentyl glycol, 1,4-cyclohexanedimethanol, 2-ethyl-2-butyl-1,3-propanediol, or a mixture thereof (the term "moiety" as used herein designates the residual portion of the reactant acid or polyol which actually enters into or onto the polymer chain during the condensation or polycondensation reaction).

The weight average molecule weight of the polyester is preferably 5,000 to 25,000; more preferred is 10,000 to 20,000.

The number average molecular weight of the polyester is preferably 1,000 to 5,000; more preferred is 1,500 to 3,500.

It is preferred that the acid number of the polyester is less than 20, more preferred is less than 10.

The pigmented aqueous dispersion of the polyester is preferably stable. Stability is defined as the absence of polymer coagulation or phase separation of an aqueous polyester preparation (15 to 80 weight percent polyester solids) after shelf storage for a minimum of four months at 20° to 30° C. Dispersions of the polyesters prepared according to the present invention were generally stable for over six months. The ICI viscosity at 200° C. of the water-dissipatable polyester is preferably about 15P to about 30P.

The polyester can be prepared by methodology that is the same or similar to that disclosed in the art, e.g., in U.S. Pat. Nos. 3,734,874; 3,779,993; and 4,233,196; the disclosures of which are incorporated herein by reference in their entirety. A two-step process (i.e., preparation by staging) is preferred which comprises:

(I) contacting the total amount of reactant (b) (100%) to be reacted with sufficient base functionality (hydroxy- and amino-containing reactants) selected from reactants (c), (d) and (e) and sufficient acid functionality selected from reactants (a), (d), and (e) in the presence of a catalytic amount of a catalyst under conditions such that a clear intermediate reaction product is formed, (II) contacting the intermediate reaction product formed by step (I) with all remaining reactants in the presence of a catalytic amount of a catalyst such that the desired water-dissipatable polyester is formed.

A preferred temperature for this two step process is 160°-240° C., more preferred is 180°-230° C. The catalyst is preferably an organo-metallic compound especially a tin or titanium containing compound. Examples include dibutyltinoxide, stannous oxalate, butylstannoic acid, and titaniumtetraisopropoxide. The catalytic amount is preferably 0.1%, based on the total weight of reactants. It is preferred that 25-35% of reactant (a), 80-100% of reactant (c), 50-100% of reactant (d) and 0-100% of reactant (e) are reacted in step (I) and, conversely, 65-75% of reactant (a), 0-20% of reactant (c), 0-50% of reactant (d), and 0-100% of reactant (e) are reacted in step (II). These percentages as used in this context are based on the total mols of each of the reactants to ultimately be reacted (i.e., (a), (b), (c), (d), and (e)) to each be equal to 100 mol %.

The particular polyester can be isolated neat; however, it is desirable for typical material handling purposes to prepare a dispersion or solution of the polyester. This dispersion or solution comprises 10 to 50 weight percent of liquid which comprises 0 to 90 weight percent water and 10 to 100 weight percent of a suitable oxygen-containing organic solvent such as alcohols, ketones, esters and ethers; preferred are low molecular weight alcohols such as $C_1$-$C_{10}$ alcohols, e.g., ethanol, n-propanol, iso-propanol, and iso-butanol. Such a dispersion can be used as a coating composition or can be used as a pre-dispersion to prepare a coating composition. The pH of such a dispersion is preferably about 4 to about 7; more preferred is 5 to about 6.

The coating composition of the present invention comprises a pigment containing dispersion that is in the substantial absence of basic amines containing:

(A) about 15 to about 45 percent, based on the weight of the total composition, of a polyester material prepared from monomers including at least one dicarboxylic acid sulfomonomer;

(B) about 30 to about 75 percent, based on the weight of the total coating composition, of water;

(C) about 10 to about 40 percent, based on the weight of the polyester, of a pigment;

(D) about 0.3 to about 5 percent, based on the weight of the polyester, of a non-amine wetting and dispersing agent;

(E) about 0 to about 20 percent, based on the weight of the total coating composition, of a suitable oxygen-containing organic solvent; and (F) about 0 to about 40 percent, based on the weight of the polyester, of a crosslinking agent.

Preferred amounts of (A) are 20 to 40 percent; more preferred are 25 to 30 percent. Preferred amounts of (B) are 40 to 60 percent; more preferred are 45 to 50 percent. Preferred amounts of (C) are 15 to 30 percent; more preferred are 20 to 30 percent. Preferred amounts of (D) are 0.5 to 3 percent; more preferred are 0.5 to 1 percent. Preferred amounts of (E) are 3 to 10 percent; more preferred are 4 to 6 percent. Preferred amounts of (F) are 5 to 20 percent; more preferred are 5 to 10 percent.

As appreciated in the art, the exact components and properties of components desired for any given coating application can vary, and therefore, routine experimentation may be required to determine the optional components and proportions of components for a given application and desired properties.

Preferred crosslinking agents contain substituted melamine and urea resins or residues such as hexamethoxymethylmelamine, hexabutoxymethylmelamine, tetramethoxymethylurea, or tetrapropoxymethylurea.

The coating composition optionally contains up to 70 weight percent based on the weight of polyester of one or more additional coating additives.

A preferred amount of coating additives is 1 to 30 percent. Examples of such coating additives include flow control additives such as silicones, fluorocarbons, or cellulosics; coalescing solvents such as diethylene glycol monobutyl ether, trimethylpentanediol monoisobutyrate, or ethylene glycol mono-octyl ether; strong acids such as p-toluenesulfonic acid, trichloroacetic acid, or trifluoromethanesulfonic acid; pigments such as titanium dioxide, barytes, clay, or calcium carbonate with titanium dioxide being most preferred; colorants such as phthalocyanine blue, molybdate orange, or carbon black; biocides such as tin compounds (e.g., tributyltin oxide), quaternary ammonium compounds, or iodine compounds; thickeners such as carboxymethyl cellulose, hydroxypropyl methyl cellulose, ethyl hydroxyethyl cellulose, guar gum; and non-amine wetting and dispersing additives that are surfactants.

The non-amine wetting and dispersing additives are silicones or polymeric surfactants with anionic, cationic and/or nonionic character, preferably polyfunctional polymers and salts thereof. Suitable examples include Disperbyk, Disperbyk-181 (solution of an alkanolammonium salt of a polyfunctional polymer), Disperbyk-101, BYK-P104S, available from BYK-Chemie USA, and silicones such as the Dow Corning silicones including Dow Corning 14 additive.

The coating composition of the present invention should not contain, or should be in the substantial absence of basic amine additives since, in some cases even traces of basic amine additives can cause severe water sensitivity and wrinkling in pigmented coatings. Basic amine additives mean additives that are primary, secondary and tertiary amines such as ammonium hydroxide, N,N'-dimethylethanolamine, and triethylamine. Basic amine additives do not include ammonium salts, such as the ammonium salts of the wetting and dispersing additives. The pigmented coating composition of the present invention should, however, contain a surfactant that is a wetting and dispersing additive. Pigmented coating compositions that are in the substantial absence of basic amine additives containing a wetting and dispersing additive are illustrated in Examples 9 and 10. A high number, such as over 200 hours, on the Cleveland humidity or condensation test clearly shows water resistance. The coatings prepared according to the present invention were not susceptible to water for times over 900 hours.

The coating composition is essentially an enamel and can be prepared by the techniques described herein and/or by techniques known in the art, e.g., as disclosed in U.S. Pat. Nos. 4,698,391, 4,737,551, and 3,345,313; the disclosures of which are incorporated herein by reference in their entirety.

The coating composition can be coated into a substrate and crosslinked using techniques known in the art; e.g., by spray-applying a wet coating and baking in a 150° C. forced air oven for 30 minutes to result in a dry film of about 0.5 to 2 mils (0.0125 to 0.05 mm).

The substrate can be any common substrate such as paper; films such as polyester, polyethylene or polypropylene; metals such as aluminum or steel; glass; urethane elastomers, primed (painted) substrates; and the like.

After the coating composition is coated onto a substrate and cured (i.e., crosslinked) such cured coating has many desirable properties such as good surface smoothness, good pencil hardness, good gloss, good flexibility, good stain resistance, good humidity resistance, good impact resistance, and good MEK double rub solvent resistance.

Preferred pencil hardness (mar/cut) is B to 6H; more preferred is F/6H; preferred impact resistance (direct) is 20 to 160 in lbs., more preferred is 160 in lbs.; preferred impact resistance (reverse) is 10 to 160 in lbs., or more preferred is 160 in lbs.; preferred gloss at 20° C. is 60% to 80%, more preferred is 80%; preferred gloss at 60° is 70% to 100%, more preferred is 99%; preferred MEK double rub resistance at least is 200, preferred is at least 250.

The following examples are to illustrate the present invention but should not be interpreted as a limitation thereof.

EXAMPLES

The applicable test procedures as described herein are as follows:
1. Film thickness (Fisher Deltascope MP2—ASTM B499).
2. Gloss (ASTM D523)
3. Hardness (ASTM D3363)
4. Impact Resistance (ASTM D2794)
5. Solvent Resistance (ASTM D1308)
6. Cleveland Humidity (ASTM D2247)
7. Acid value of Resins (ASTM D465)
8. ICI Cone and Plate Viscosity of Resins (ASTM D4287)

EXAMPLE 1—Control

To a three-neck round bottom flask equipped with a mechanical stirrer, a steam partial-condenser, a Dean-Stark trap, and a water condenser were charged the following reactants: NPG 119.0 g (1.14 mol), TMP 26.8 g (0.20 mol), IPA 58.4 g (0.35 mol), 5-SSIPA 10.3 g (0.035 mole. 5-SSIPA is hygroscopic and can accumulate moisture. The amount shown assumes 8% water accumulation.), and the catalyst, Fascat 4100 from Atochem North America, Inc., 0.25 g. The mixture was heated to 150° C. and stirred under $N_2$ atmosphere. The temperature was then gradually increased to 200° C. and the distillate (water) was collected in the Dean-Start trap until the mixture was clear (about 1 hr). The mixture was then cooled to 150° C., and the second stage reactants, IPA 58.4 g (0.35 mol) and AD 71. 8 g (0.49 mol), were added. The temperature was gradually raised to 220° C., and the reaction continued for four more hours to yield a resin with an acid number of 6. The properties of this resin are illustrated in Tables I, II, and III as control.

EXAMPLE 2—Preparation of Propylene Glycol Treated 5-SSIPA Resin (Resin 1)

To a three-neck round bottom flask equipped with a mechanical stirrer, a steam partial-condenser, a Dean-Stark trap, and a water condenser were charged the following reactants: NPG 119.0 g (1.14 mol), TMP 26.8 g (0.20 mol), IPA 20.0 g (0.12 mol), 5-SSIPA 10.3 g (0.035 mol), and the catalyst, Fascat 4100, 0.25 g. The mixture was heated to 150° C. and stirred under $N_2$ atmosphere. The temperature was then gradually increased to 200° C. and the distillate (water) was collected in the Dean-Stark trap until the mixture was clear (about 1 hr). The mixture was then cooled to 150° C., and the second stage reactants, IPA 96.8 g (0.58 mol) and AD 71.8 g (0.49 mol), were added. The temperature was gradually raised to 220° C., and the reaction continued for four more hours to yield a resin with an acid number of 12.

To the above resin in a flask equipped with a water condenser was added propylene oxide (15 g). The mixture was gradually heated to 150° C. and stirred for 3 hr. The resulting propylene oxide treated SIP resin was clear and had an acid number of 4. The properties of this resin are illustrated in Tables I, II and III as Resin 1. The predispersion was prepared first by dissolving the resulting resin in isopropanol (60 g) at 80° C., followed by dispersing in distilled water (60 g).

EXAMPLE 3. Preparation of Diglycidyl Ether of Bisphenol A Treated 5-SSIPA Resin To a three-neck round bottom flask equipped with a mechanical stirrer, a steam partial condenser, a Dean-Stark trap, and a water condenser were charged the following reactants: NPG 119.0 g (1.14 mol), TMP 26.8 g (0.20 mol), IPA 58.5 g (0.35 mol), 5-SSIPA 9.5 g (0.033 mol), and the catalyst, Fascat 4100, 0.15 g. The mixture was heated to 150° C. and stirred under $N_2$ atmosphere. The temperature was then gradually increased to 180° C. and the distillate (water) was collected in the Dean-Stark trap. The reaction was continued until the mixture was clear and the acid number was about 50. The mixture was then cooled to 150° C., and the second stage reactants, IPA 58.5 g (0.35 mol), AD 71.9 g (0.49 mol) and the catalyst, Fascat 4100, 0.15 g, were added. The temperature was gradually raised to 215° C., and the reaction continued for four more hours to yield a resin with an acid number of 8 to 13.

The above resin flask was cooled to 150° C. and the steam partial condenser was replaced with a water condenser. To the resin was added diglycidyl ether of bisphenol A (Dow DER 331, 13.2 g). The mixture was maintained at 150° C. and stirred for 4 hr. The resulting resin was clear and had an acid number of 5. The predispersion was prepared first by dissolving the resulting resin in isopropanol (60 g) at 80° C., followed by dispersing in distilled water (60 g). This predispersion had a pH of 5.6 and was still stable without separation after over one year of storage.

EXAMPLE 4. Preparation of Glycidyl Ester of Neodecanoic Acid Treated 5-SSIPA Resin To a three-neck round bottom flask equipped with a mechanical stirrer, a steam partial condenser, a Dean-Stark trap, and a water condenser were charged the following reactants: NPG 119.0 g (1.14 mol), TMP 26.8 g (0.20 mol), IPA 58.5 g (0.35 mol), 5-SSIPA 9.5 g (0.033 mol), and the catalyst, Fascat 4100, 0.15 g. The mixture was heated to 150° C. and stirred under $N_2$ atmosphere. The temperature was then gradually increased to 180° C. and the distillate (water) was collected in the Dean-Stark trap. The reaction was continued until the mixture was clear and the acid number was about 50. The mixture was then cooled to 150° C., and the second stage reactants, IPA 58.5 g (0.35 mol), AD 71.9 g (0.49 mol) and the catalyst, Fascat 4100, 0.15 g, were added. The temperature was gradually raised to 215° C., and the reaction continued for four more hours to yield a resin with an acid number of 8 to 13.

The above resin flask was cooled to 150° C. and the steam partial condensor was replaced with a water condenser. To the resin was added glycidyl ester of neodecanoic acid (Shell Cardura E-10, 17.6 g). The mixture was maintained at 150° C. and stirred for 4 hr. The resulting resin was clear and had an acid number of 1. The predispersion was prepared first by dissolving the resulting resin in isopropanol (60 g) at 80° C., followed by dispersing in distilled water (60 g). This predispersion had a pH of 5.7 and was still stable without separation after nine months of storage.

EXAMPLE 5. Preparation of EG SIP Resin (Resin 2)

To a three-neck round bottom flask equipped with a mechanical stirrer, a steam partial condenser, a Dean-Stark trap, and a water condenser were charged the following reactants: NPG 115.3 g (1.11 mol), TMP 26.8 g (0.20 mol), IPA 64.3 g (0.39 mol), EG-SIP (bis(2-hydroxyethyl)-5-(sodiosulfo)isophthalate) 13.4 g (0.035 mol), and the catalyst, Fascat 4100, 0.25 g. The mixture was heated to 150° C. and stirred under $N_2$ atmosphere. The temperature was then gradually increased to 200° C. and the distillate (water) was collected in the Dean-Stark trap until the mixture was clear (about 1 hr). The mixture was then cooled to 150° C., and the second stage reactants, IPA 58.4 g (0.35 mol) and AD 71.8 g (0.49 mol), were added. The temperature was gradually raised to 220° C., and the reaction continued for three more hours to yield a resin with an acid number of 6. The predispersion was prepared first by dissolving the resin (50 g) in isopropanol (10 g) at 80° C., followed by dispersing in distilled water (10 g). The properties of this resin are illustrated in Tables I, II and III as Resin 2.

EXAMPLE 6. Preparation of 5-SSIPA Resin Via NPG SIP in situ (Resin 3)

To a three-neck round bottom flask equipped with a mechanical stirrer, a steam partial condenser, a Dean-Stark trap, and a water condenser were charged the following reactants: NPG 64.5 g (0.62 mol), 5-SSIPA 5.2 g (0.018 mol), and the catalyst, Fascat 4100, 0.1 g. The mixture was heated to 150° C. and stirred under $N_2$ atmosphere. The temperature was then gradually increased to 220° C. and the distillate (water) was collected in the Dean-Stark trap until the mixture was clear (about 1 hr). The acid number was determined to be close to zero, and the mixture was cooled to 150° C. The second stage reactants, TMP 13.4 g (0.1 mol), IPA 58.4 g (0.35 mol), and AD 35.9 g (0.25 mol), were then added. The temperature was gradually raised to 220° C., and the reaction continued for four more hours to yield a resin with an acid number of 2. The predispersion was prepared first by dissolving the resulting resin in isopropanol (30 g) at 80° C., followed by dispersing in distilled water (30 g). The properties of this resin are illustrated in Tables I, II and III as Resin 3.

TABLE I

| | Resin Properties | | | |
| --- | --- | --- | --- | --- |
| | control | resin 1 | resin 2 | resin 3 |
| molecular weight | | | | |
| number average | 2000 | — | 2222 | 2735 |
| weight average | 12200 | — | 10558 | 15342 |
| ICI Viscosity, P | 54 @ 150° C. | — | 41 @ 175° C. | 40 @ 175° C. |
| acid number | 6 | 4 | 6 | 2 |
| predispersion pH | 3-4 | 5-6 | 5-6 | 5-6 |

The properties of various resins and their predispersions are listed above in Table I. The control resin was prepared in Example 1 similarly as described in U.S. Pat. No. 4,910,292. Resin 1 from Example 2 is prepared by method 1, resin 2 from Example 3 by method 2, and resin 3 from Example 5 by method 3. The results in Table I illustrate that the predispersion pH of resin 1, resin 2, or resin 3 is significantly higher than that of the control resin. The dispersion of the control formed two layers after several weeks of storage at room temperature, indicating the polyester resin was hydrolyzed. While dispersion 1, 2, and 3 showed no change after sitting at room temperature for over one year, and good coatings could still be prepared from these dispersions.

EXAMPLE 7. Preparation of Clear Enamels

Clear enamels were prepared by dispersing 28 g of the various resin predispersions from Examples 1, 2, 5 and 6 in distilled water (35 ml) with a blender (Waring), followed by the addition and mixing of the cross-linker, hexamethoxymethylmelamine (Cymel 303 from American Cyanamid Company, 8 g), and the flow control additive (20% Fluorad FC-430 from 3M Company in i-PrOH, 0.3 g). The clear enamels were then formed into clear coatings according to ASTM standard method D823. The coatings were cured at 175° C. for 1 hr. The film thickness was 1.0–1.5 mils (0.025–0.038 mm). All clear coatings showed good properties in hardness, impact resistance, solvent resistance and particularly water resistance. The results of these coatings are illustrated in Table II below:

TABLE II

| | Clear Coating Properties | | | |
|---|---|---|---|---|
| | control | resin 1 | resin 2 | resin 3 |
| gloss, 60°/20° | 98/79 | 95/63 | 96/68 | 98/78 |
| pencil hardness | 3H | 3H | 4H | 3H |
| impact resistance (lb-in) | | | | |
| direct/reverse | 160/160 | 160/160 | 160/160 | 160/160 |
| solvent resistance (MEK double rubs) | >500 | >500 | >500 | >500 |
| cleveland humidity | >200 hr | >200 hr | >200 hr | >200 hr |

EXAMPLE 8. Preparation of Pigmented Enamels with an Amine Additive

White enamels were prepared by dispersing 28 g of the resin predispersions from Examples 1, 2, 5 and 6 in distilled water (20 ml) with a blender (Waring), followed by the addition and mixing of a solution of the $TiO_2$ pigment (Du Pont R-931, 20 g) and N,N'-dimethylethanolamine (DMEA, 0.5 ml) in distilled water (30 ml). This was then followed by the addition of the cross-linker (Cymel 303, 8 g), and the flow control additive (20% Fluorad FC-430 in i-PrOH, 0.3 g). The addition of a very small amount of an amine, DMEA (resin: DMEA = 100:1) was to reduce the $TiO_2$ solution viscosity and to further stabilize the pigmented enamels. This improved pigmentation technique prevented the enamels from immediate flocculation. Nevertheless, the pigmented enamel prepared from the control resin was stable for only two days whereas the enamels of resins 1, 2, and 3 were stable for over one month. Coatings of these enamels were then prepared as above. The coatings were cured at 150° C. for 30 min. The film thickness was 1.0–1.5 mil (0.025–0.038 mm). The properties of the white coatings prepared from the various pigmented enamels are illustrated in Table III below.

TABLE III

| | White Coating Properties | | | |
|---|---|---|---|---|
| | control | resin 1 | resin 2 | resin 3 |
| gloss, 60°/20° | 80/37 | 65/22 | 88/46 | 80/36 |
| pencil hardness | 6H | 6H | 4H | 4H |
| impact resistance | | | | |

TABLE III-continued

| | White Coating Properties | | | |
|---|---|---|---|---|
| | control | resin 1 | resin 2 | resin 3 |
| (lb-in) | | | | |
| direct/reverse | 120/80 | 120/80 | 160/160 | 160/16 |
| solvent resistance (MEK double rubs) | >500 | >500 | >500 | >500 |
| cleveland humidity | 10 hr | 10 hr | 150 hr | 10 hr |
| enamel stability | 2 days | >30 days | >30 days | >30 days |

EXAMPLE 9. Preparation of Pigmented Enamels with a Non-Amine Additive

A white enamel was prepared first by dispersing the above resin 3 predispersion from Example 6 (28 g) in distilled water (25 ml) with a blender (Waring). A slurry of $TiO_2$ pigment (Du Pont R-902, R-960, or R-931) was prepared separately by mixing $TiO_2$ (20 g) and Disperbyk-181 (0.5 g) in distilled water (15 ml). The slurry was then added to the above resin dispersion, followed by the cross-linker (Cymel 303, 8 g), and the flow control additive (20 % Fluorad FC-430 in i-PrOH, 0.3 g). The mixture was stirred for about five minutes to yield a white enamel.

EXAMPLE 10. Coating Preparation and Testing

The coatings were prepared by applying the various enamels from Example 9 with different grades of $TiO_2$ pigment (i.e. Du Pont R-902, R-960, and R-931) to cold-rolled steel test panels and cured at 175° C for 20 min. The water resistance of the coatings was tested by using a Cleveland Condensation Tester (The Q-Panel Company) at 60° C according to ASTM Method D2247. It was observed that no wrinkling appeared in the coatings when cured, and the coatings showed no blistering after 900 hours of Cleveland condensation test. On the contrary, the previous coatings from Example 8 containing an amine additive appeared wrinkled and showed blistering after 10 hours.

This shows that the pigmented coating composition containing a non-amine wetting and dispersing additive provides a coating that is not water sensitive and is wrinkle free.

I claim:

1. A pigmented coating composition comprising an aqueous dispersion that is in the substantial absence of basic amines comprising:
   (A) about 15 to about 45 percent, based on the weight of the total composition of a polyester material prepared from monomers including at least one dicarboxylic acid sulfomonomer, wherein a significant number of the carboxyl end groups attached to the sulfomonomer residue in the polyester are capped;
   (B) about 30 to about 75 percent, based on the weight of the total coating composition, of water;
   (C) about 10 to about 40 percent, based on the weight of the polyester, of a pigment;
   (D) about 0.3 to about 5 percent, based on the weight of the polyester, of a non-amine wetting and dispersing agent;
   (E) about 0 to about 20 percent, based on the weight of the total coating composition, of a suitable oxygen-containing organic solvent; and
   (F) about 0 to about 40 percent of a crosslinking agent, based on the weight of the polyester and the crosslinking agent.

2. The composition according to claim 1 wherein the composition comprises (A) 20 to 40 percent; (B) 40 to 60 percent; (C) 15 to 30 percent; (D) 0.5 to 3 percent; (E) 3 to 10 percent; and (F) 5 to 20 percent.

3. The composition according to claim 1 wherein said non-amine wetting and dispersing agent is a silicone or polymeric surfactant.

4. The composition according to claim 1 wherein said pigment is selected from the group consisting of titanium dioxide, barytes, clay and calcium carbonate.

5. The composition according to claim 1 wherein the polyester material of (A) is made of the moieties of reaction products:
   (a) at least one difunctional dicarboxylic acid which is not a sulfomonomer;
   (b) about 1 to 20 mol % of at least one dicarboxylic acid sulfomonomer containing at least one metallic sulfonate group or nitrogen-containing non-metallic sulfonate group attached to an aromatic or cycloaliphatic nucleus;
   (c) at least one difunctional reactant selected from a glycol or a mixture of a glycol and diamine having two —NRH groups, the glycol containing two —$C(R^1)_2$—OH groups wherein R in the reactant is hydrogen or an alkyl group of 1 to 6 carbon atoms, and $R^1$ in the reactant is a hydrogen atom, an alkyl of 1 to 5 carbon atoms, or an aryl group of 6 to 10 carbon atoms;
   (d) about 0 to 40 mol % of difunctional reactant selected from hydroxycarboxylic acids having one —$C(R)_2$—OH group, aminocarboxylic acids having one —NRH group, amino-alcohols having one —$C(R)_2$—OH group and one —NRH group, or mixtures of said difunctional reactants wherein R in the reactant is hydrogen or an alkyl group of 1 to 6 carbon atoms; and
   (e) 0 to 40 mol % of a multifunctional reactant containing at least three functional groups selected from hydroxyl, carboxyl, and mixtures thereof, wherein the polyester has a predispersion pH greater than 4 and all stated mol percentages are based on the total of all acid, hydroxyl and amino group containing reactants being equal to 200 mol %, and wherein the polymer contains proportions of acid-group containing reactants (100 mol % acid) to hydroxy- and amino-group containing reactants (100 mol % base) such that the value of EQ (base) divided by EQ (acid) is between about 1 and 1.6.

6. The composition according to claim 5 wherein the polyester has essentially no carboxyl end groups attached to the (b) residue.

7. The composition according to claim 5 wherein the carbonyl end groups are oxirane end capped.

8. The composition according to claim 5 wherein the carboxyl functionality of the sulfomono end groups of the polyester are capped by glycol.

9. The composition according to claim 5 wherein reactant (b) is a diol that is a diester adduct of glycol and the dicarboxylic acid sulfomonomer.

10. The composition according to claim 5 wherein the moiety from reactant (a) is between about 20 and 100 mol % of an aromatic dicarboxylic acid, and about 10 to 80 mol % of an aliphatic dicarboxylic acid, the moiety from reactant (b) is present in a concentration of about 1 to about 20 mol %, and the moiety from reactant (c) is present in a concentration of at least 60 mol %.

11. A shaped or formed article coated with the cured composition according to claim 1.

12. A coated substrate comprising the coating composition according to claim 1 coated onto a substrate.

13. The coated substrate of claim 12 wherein said substrate is paper, polyethylene, polypropylene, polyester, aluminum, steel, glass, or a urethane elastomer.

14. A process for the preparation of a polyester dispersion composition comprising an aqueous dispersion that is in the substantial absence of basic amines comprising:
   (I) reacting the reactants (a), (b), (c), (d), and (e) under polycondensation conditions;
   (II) reacting the resultant polyester with about 1 to 15 weight % of at least one reactive oxirane containing compound; and
   (III) dispersing the reacted polyester of II, pigment, and non-amine wetting and dispersing additive in water wherein the reactants are:
   (a) at least one difunctional dicarboxylic acid which is not a sulfomonomer;
   (b) about 1 to 20 mol % of at least one dicarboxylic sulfomonomer containing at least one metallic sulfonate group or nitrogen-containing non-metallic sulfonate group attached to an aromatic or cycloaliphatic nucleus;
   (c) at least one difunctional reactant selected from a glycol or a mixture of a glycol and diamine having two —NRH groups, the glycol containing two —$C(R^1)_2$—OH groups wherein R in the reactant is hydrogen or an alkyl group of 1 to 6 carbon atoms, and $R^1$ in the reactant is a hydrogen atom, an alkyl of 1 to 5 carbon atoms, or an aryl group of 6 to 10 carbon atoms;
   (d) about 0 to 40 mol % of difunctional reactant selected from hydroxycarboxylic acids having one —$C(R)_2$—OH group, aminocarboxylic acids having one —NRH group, amino-alcohols having one —$C(R)_2$—OH group and one —NRH group, or mixtures of said difunctional reactants wherein R in the reactant is hydrogen or an alkyl group of 1 to 6 carbon atoms; and
   (e) 0 to 40 mol % of a multifunctional reactant containing at least three functional groups selected from hydroxyl, carboxyl, and mixtures thereof, wherein the resulting polyester has a predispersion pH greater than 4 with a substantial number of the carboxyl end groups attached to reactant (b) residue being capped and wherein all stated mol percentages are based on the total of all acid, hydroxyl and amino group containing reactants being equal to 200 mol %, and wherein the polymer contains proportions of acid-group containing reactants (100 mol % acid) to hydroxy- and amino-group containing reactants (100 mol % base) such that the value of EQ (base) divided by EQ (acid) is between about 1 and 1.6.

15. The process according to claim 14 wherein said oxirane containing compound is selected from branched and linear 1,2-epoxyalkanes; saturated and unsaturated, linear and branched, aromatic and aliphatic $C_3$-$C_{18}$ glycidyl ethers; saturated and unsaturated, linear and branched, aromatic and aliphatic $C_3$-$C_{18}$ glycidyl esters; epoxidized oils and esters with oxirane content higher than 5%; and epoxy resins being products of the reaction of epichlorohydrin and bisphenol A.

16. The process according to claim 15 wherein said oxirane containing compound is selected from propylene oxide, diglycidyl ethers of bisphenol A, and mixtures thereof.

17. The process for preparation of the polyester according to claim 14 comprising
   (I) contacting the total amount of reactant (b) (100%) to be reacted with sufficient base functionality (hydroxy- and amino-containing reactants) selected from reactants (c), (d) and (e) and sufficient acid functionality selected from reactants (a), (d), and (e) in the presence of a catalytic amount of a catalyst under conditions such that a clear intermediate reaction product is formed, and
   (II) contacting the intermediate reaction product formed by step (I) with all remaining reactants in the presence of a catalytic amount of a catalyst such that the desired water-dispersible polyester is formed.

18. A process for the preparation of a polyester comprising:
   1) reacting the following reactants under polycondensation conditions;
      (a) at least one difunctional dicarboxylic acid which is not a sulfomonomer;
      (b) about 1 to 20 mol % of at least one diol that is a diester adduct of a glycol and a dicarboxylic acid sulfomonomer containing at least one metallic sulfonate group or nitrogen-containing nonmetallic sulfonate group attached to an aromatic or cycloaliphatic nucleus;
      (c) at least one difunctional reactant selected from a glycol or a mixture of a glycol and diamine having two —NRH groups, the glycol containing two —C($R^1$)$_2$—OH groups wherein R in the reactant is hydrogen or an alkyl group of 1 to 6 carbon atoms, and $R^1$ in the reactant is a hydrogen atom, an alkyl of 1 to 5 carbon atoms, or an aryl group of 6 to 10 carbon atoms;
      (d) about 0 to 40 mol % of difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants wherein R in the reactant is hydrogen or an alkyl group of 1 to 6 carbon atoms; and
      (e) 0 to 40 mol % of a multifunctional reactant containing at least three functional groups selected from hydroxyl, carboxyl, and mixtures thereof; and dispersing the polyester, pigment, and non-amine wetting and dispersing additive in water; and
   2) dispersing the polyester, pigment, and non-amine wetting and dispersing additive in water;
   wherein the resulting polyester has a predispersion pH greater than 4 with a substantial number of the carboxyl end groups attached to reactant (b) residue being capped and wherein all stated mol percentages are based on the total of all acid, hydroxyl and amino group containing reactants being equal to 200 mol %, and wherein the polymer contains proportions of acid-group containing reactants (100 mol % acid) to hydroxy- and amino-group containing reactants (100 mol % base) such that the value of EQ (base) divided by EQ (acid) is between about 1 and 1.6, further wherein the dispersion composition is in the substantial absence of basic amine additives.

19. The process for preparation of the polyester according to claim 18 comprising
   (I) contacting the total amount of reactant (b) (100%) to be reacted with sufficient base functionality (hydroxy- and amino-containing reactants) selected from reactants (c), (d) and (e) and sufficient acid functionality selected from reactants (a), (d), and (e) in the presence of a catalytic amount of a catalyst under conditions such that a clear intermediate reaction product is formed, and
   (II) contacting the intermediate reaction product formed by step (I) with all remaining reactants in the presence of a catalytic amount of a catalyst such that the desired water-dispersible polyester is formed.

20. The process according to claim 19 carried out at a temperature of 160° to 240° C.

* * * * *